United States Patent
Okamoto

(10) Patent No.: US 8,415,857 B2
(45) Date of Patent: Apr. 9, 2013

(54) DYNAMOELECTRIC MACHINE

(75) Inventor: Tomohisa Okamoto, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 246 days.

(21) Appl. No.: 13/030,289

(22) Filed: Feb. 18, 2011

(65) Prior Publication Data

US 2011/0221299 A1  Sep. 15, 2011

(30) Foreign Application Priority Data

Mar. 15, 2010  (JP) .................................. 2010-58216

(51) Int. Cl.
*H02K 1/22*  (2006.01)

(52) U.S. Cl. ........................................ 310/264; 310/268

(58) Field of Classification Search .......... 310/264–268,
310/89, 208, 49.22, 49.29, 49.32–49.37,
310/49.41, 49.42, 49.45, 49.46, 216.121,
310/423, 156.22, 156.32–156.37
See application file for complete search history.

(56) References Cited

U.S. PATENT DOCUMENTS 4,082,971 A * 4/1978 Miyake et al. ................ 310/114
4,228,384 A * 10/1980 Arnold et al. ............... 318/400.4
5,789,841 A * 8/1998 Wang ............................ 310/179
7,083,385 B2  8/2006 Omi
2007/0152526 A1* 7/2007 Tsai et al. ................ 310/156.32

FOREIGN PATENT DOCUMENTS

| JP | 60197150 A | * 10/1985 |
| JP | U-2-72648 | 6/1990 |
| JP | U-7-39278 | 7/1995 |
| JP | A-2008-99429 | 4/2008 |

* cited by examiner

*Primary Examiner* — Tran N. Nguyen
*Assistant Examiner* — Naishadh Desai
(74) *Attorney, Agent, or Firm* — Posz Law Group, PLC

(57) ABSTRACT

An insert member is placed on one end surface of an armature on one axial side. A rotatable shaft member is integrally molded into one piece from a resin material and includes a shaft portion, a flange portion and a boss portion. The shaft portion axially extends through the armature and the insert member. The flange portion supports the other end surface of the armature on the other axial side. The armature and the insert member are fitted to the boss portion. The urging member is axially placed between a bottom portion of a motor housing and the insert member and axially urges the armature against the flange portion.

7 Claims, 13 Drawing Sheets

DYNAMOELECTRIC MACHINE

CROSS REFERENCE TO RELATED APPLICATION

This application is based on and incorporates herein by reference Japanese Patent Application No. 2010-58216 filed on Mar. 15, 2010.

BACKGROUND OF THE INVENTION

1. Field of the Invention

The present invention relates to a dynamoelectric machine.

2. Description of Related Art

For instance, in a previously proposed printed circuit motor, which is also referred to as a printed motor or a print motor (see, for instance, Japanese Unexamined Patent Publication No. 2008-99429A and Japanese Unexamined Utility Model Publication No. H07-39278U), a rotor, which has printed coils (printed windings), is rotatably supported by a shaft.

With respect to this type of dynamoelectric machine, in a case where the shaft is made of a metal material, when ball bearings and other components are installed to the shaft, it may be required to electrically insulate between the shaft and electrically conductive components, thereby resulting in an increase in the manufacturing costs.

SUMMARY OF THE INVENTION

The present invention is made in view of the above disadvantage. Thus, it is an objective of the present invention to provide a dynamoelectric machine, which enables a reduction in costs thereof.

To achieve the objective of the present invention, there is provided a dynamoelectric machine, which includes a motor housing, an armature, an insert member, a rotatable shaft member and an urging member. The motor housing includes a bottom portion and a tubular portion. The tubular portion axially projects from the bottom portion. The armature is configured into an annular body and is rotatably received in the motor housing. The insert member is configured into an annular body and is coaxial with the armature. The insert member is placed on one end surface of the armature on one axial side where the bottom portion of the motor housing is located. The rotatable shaft member is integrally molded into one piece from a resin material and includes a shaft portion, a flange portion and a boss portion.

The shaft portion axially extends through the armature and the insert member. The flange portion is formed around an outer peripheral part of the shaft portion and supports the other end surface of the armature on the other axial side, which is opposite from the bottom portion of the motor housing. The boss portion axially projects from the flange portion on the one axial side, and the armature and the insert member are fitted to the boss portion. The urging member is axially placed between the bottom portion of the motor housing and the insert member and axially urges the armature against the flange portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
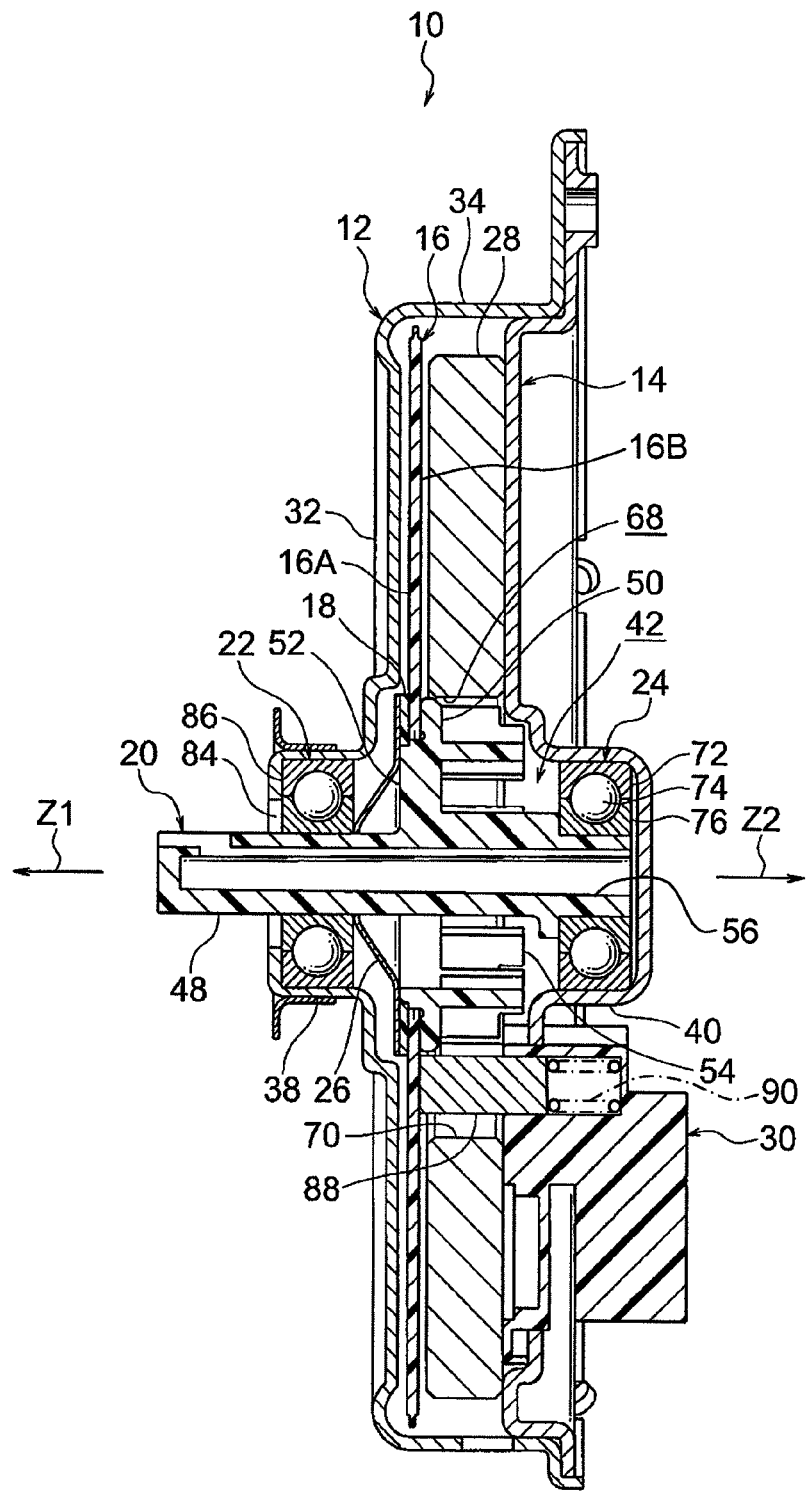
FIG. 1 is a lateral cross-sectional view of a dynamoelectric machine according to an embodiment of the present invention.
Figure 2:
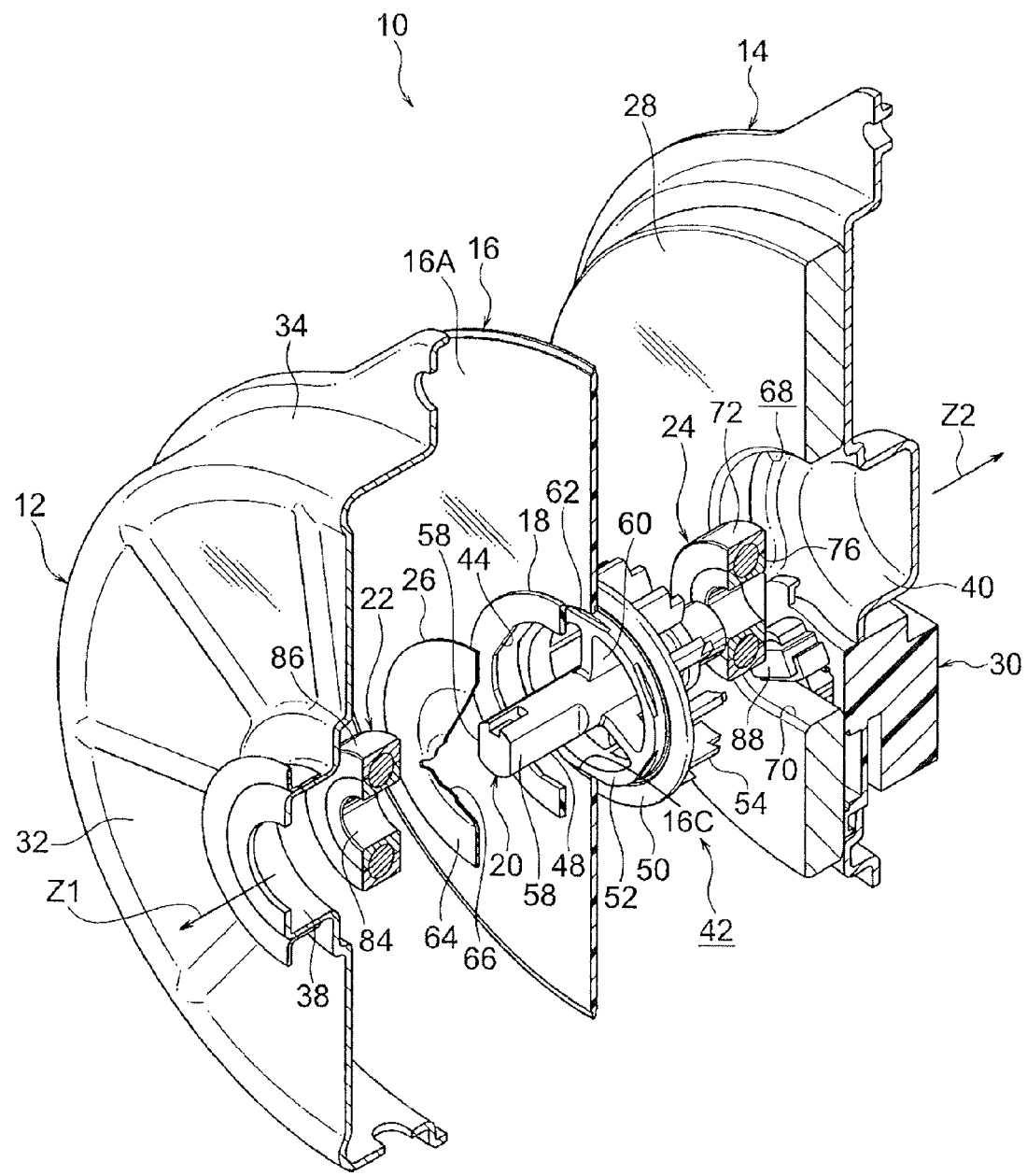
FIG. 2 is an exploded perspective view showing a part of the dynamoelectric machine shown in FIG. 1.

A dynamoelectric machine 10 according to the embodiment of the present invention shown in FIGS. 1 and 2 is a printed circuit motor (also referred to as a printed motor or print motor), which includes a motor housing 12, an end housing 14, an armature (printed armature) 16, an insert member 18, a rotatable shaft member 20, two ball bearings 22, 24, an urging member 26, a permanent magnet 28 and two brush devices 30 (only one of the brush devices 30 is shown in FIGS. 1 and 2 for the sake of simplicity).

The motor housing 12 is configured into a cup shaped body and thereby includes a bottom portion 32 and a cylindrical tubular portion 34. The tubular portion 34 axially projects from the bottom portion 32. A bearing receiving portion 38 in a form of a recess is formed at a center part of the bottom portion 32.

The end housing 14 is configured into a generally circular disc body, which is sized to close an opening of the motor housing 12 (specifically, an opening of the tubular portion 34, which is opposite from the bottom portion 32). A bearing receiving portion 40 in a form of a recess is formed in a center part of the end housing 14. When the end housing 14 and the motor housing 12 are assembled together in a manner discussed later, the end housing 14 and the motor housing 12 cooperate together to define a motor receiving space 42 therein.

The armature (printed armature) 16 is configured into a flat disc body, i.e., flat annular body (ring body) and forms printed coils (printed windings), which include a plurality of coil patterns (winding patterns) that are stacked one after another in the axial direction.

Figure 3:
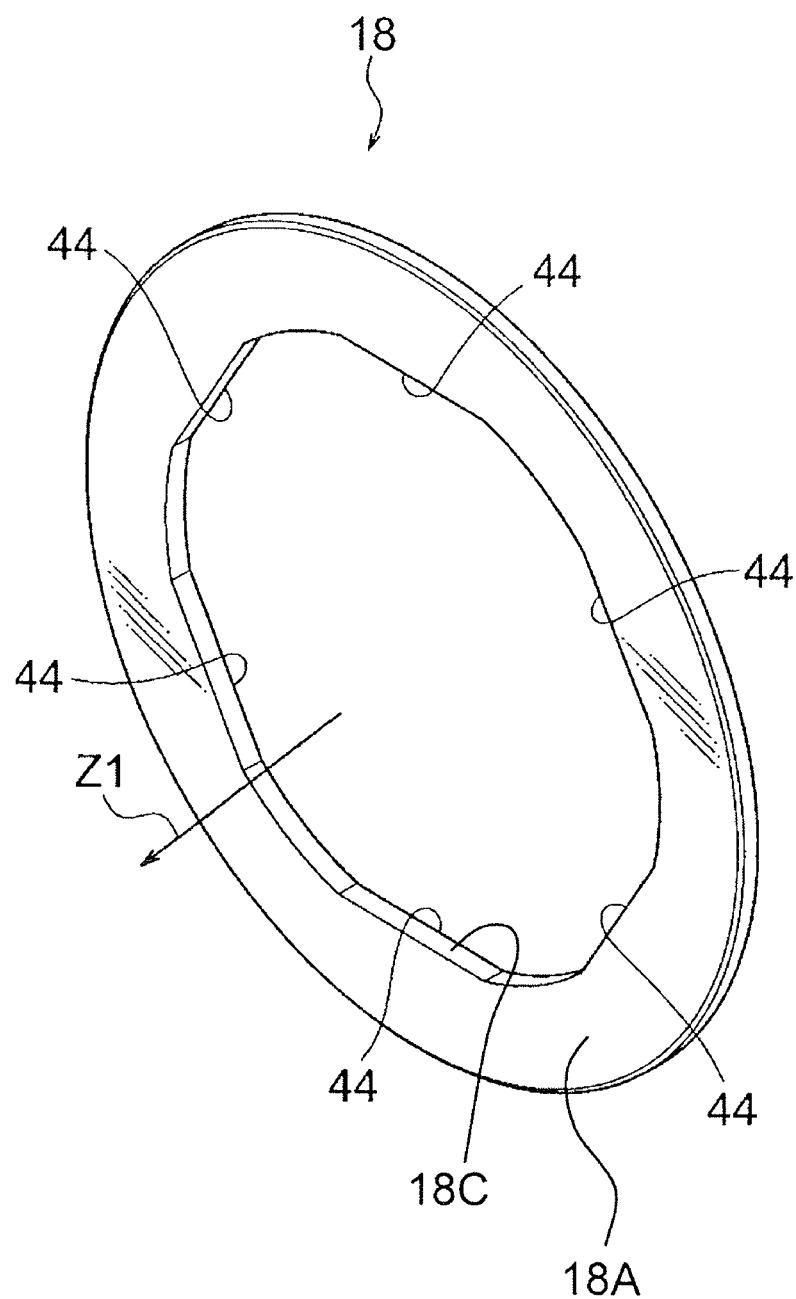
FIG. 3 is a front perspective view of an insert member shown in FIG. 1.
Figure 4:
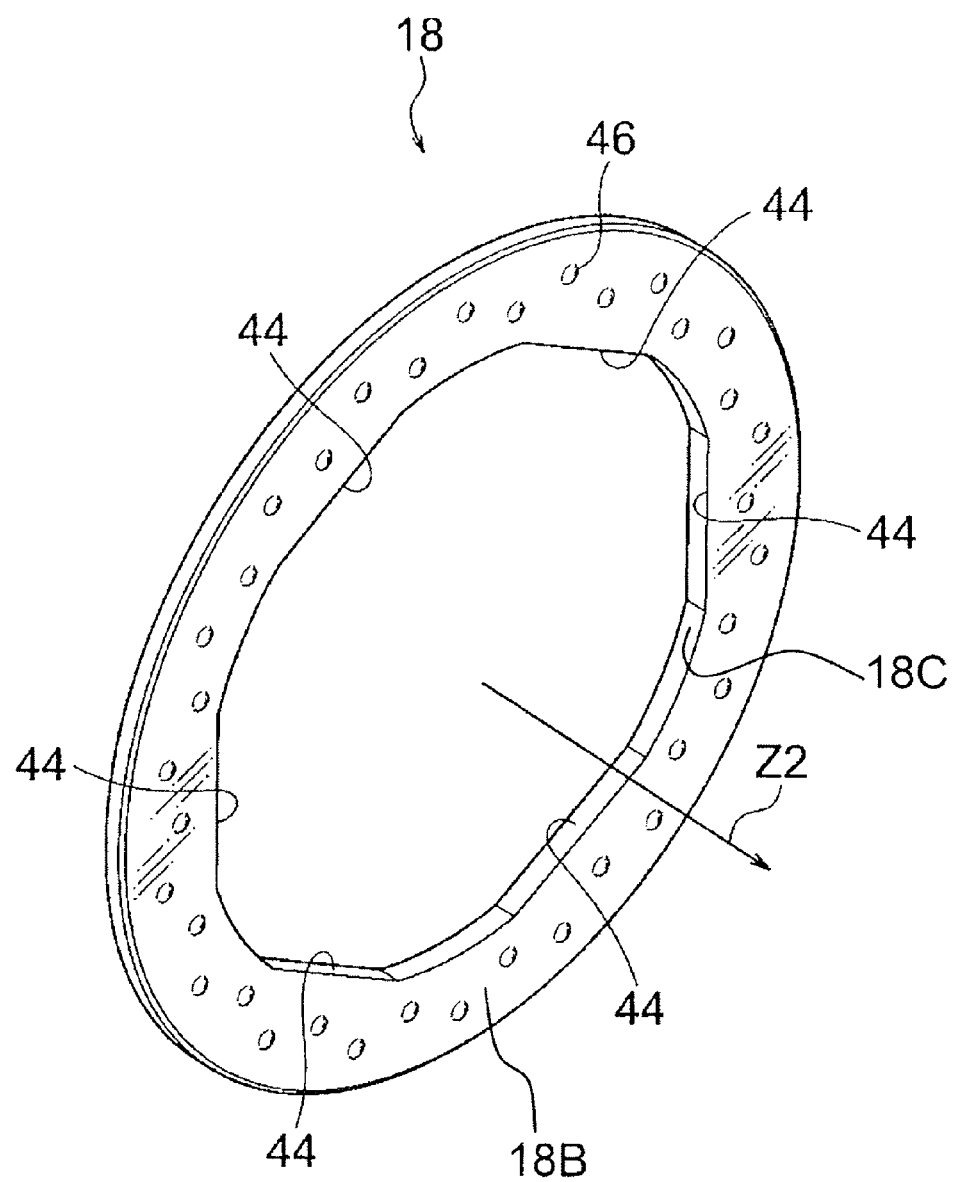
FIG. 4 is a rear perspective view of the insert member shown in FIG. 1.
Figure 5:
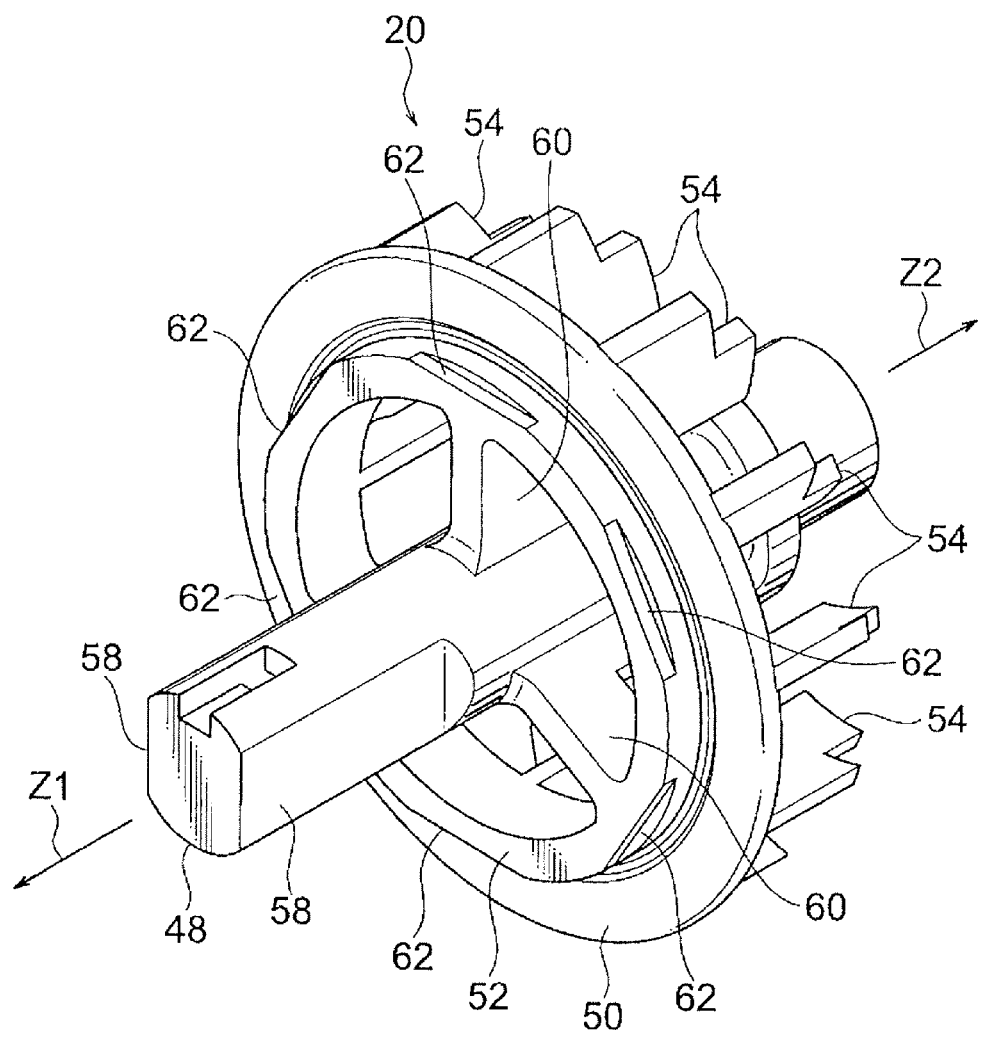
FIG. 5 is a front perspective view of a rotatable shaft member shown in FIG. 1.
Figure 6:
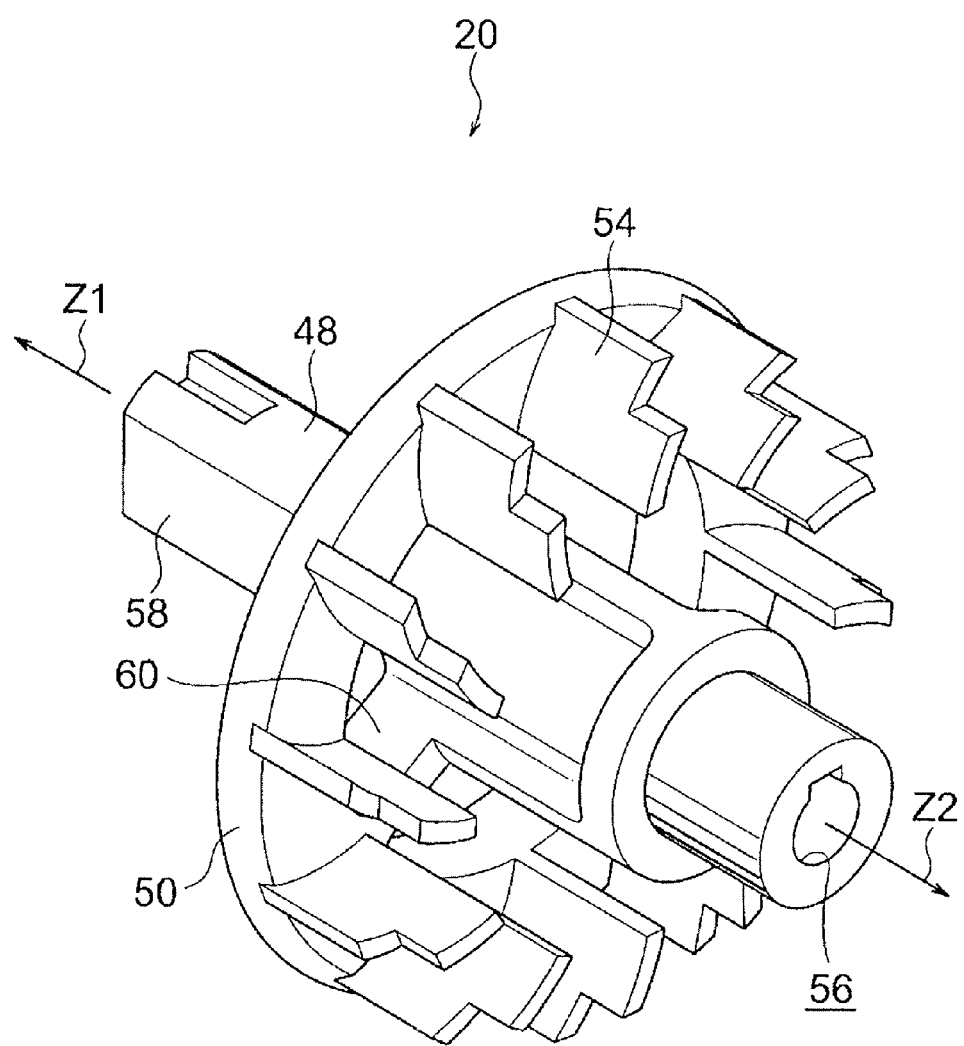
FIG. 6 is a rear perspective view of the rotatable shaft member shown in FIG. 1.
Figure 7:
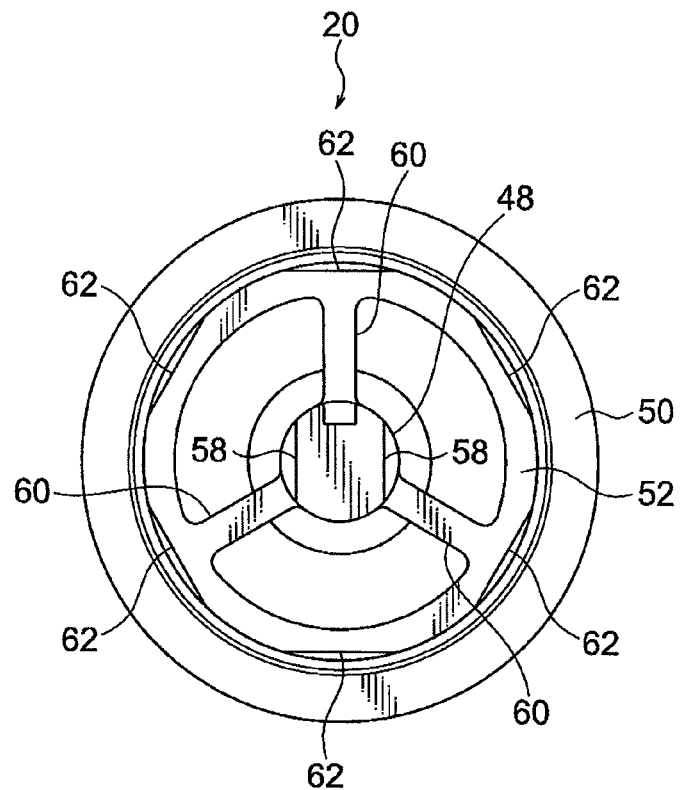
FIG. 7 is a front view of the rotatable shaft member shown in FIG. 1.
Figure 8:
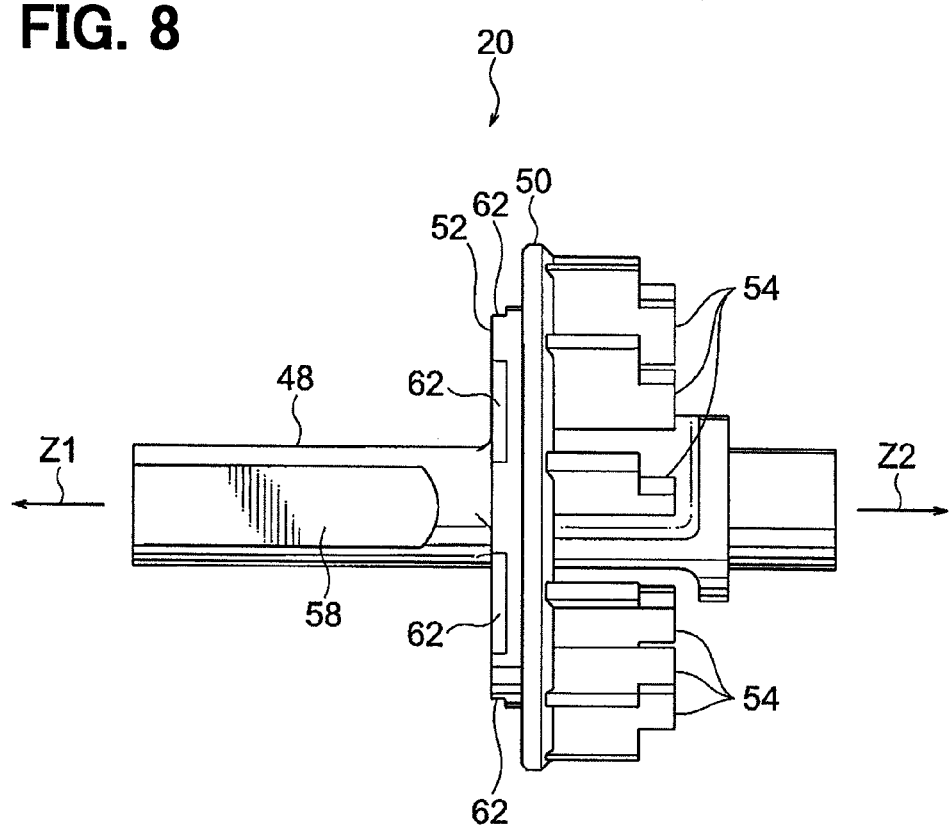
FIG. 8 is a lateral view of the rotatable shaft member shown in FIG. 1.
Figure 9:
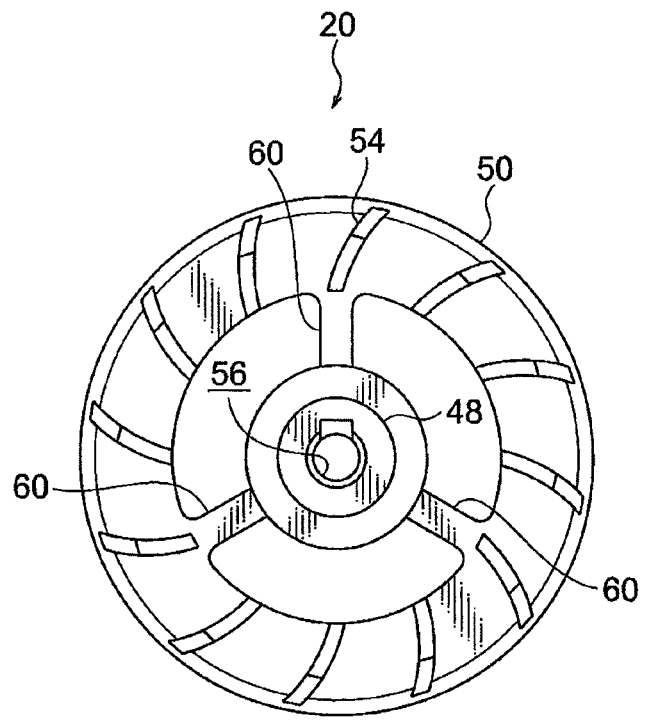
FIG. 9 is a rear view of the rotatable shaft member shown in FIG. 1.
Figure 10:
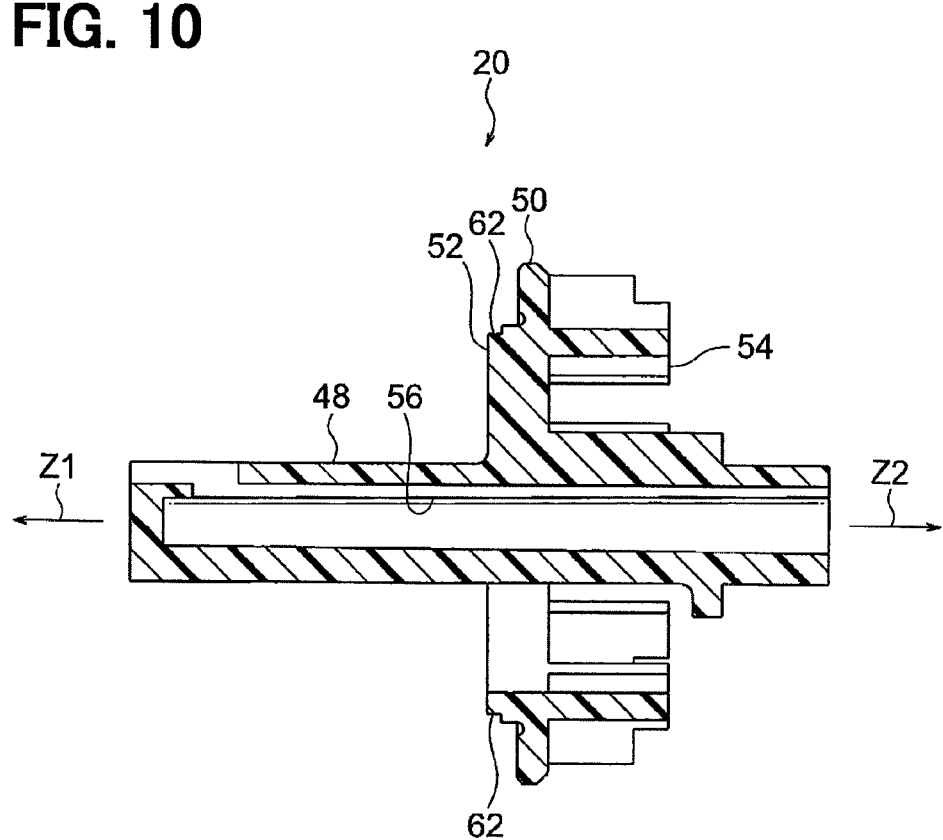
FIG. 10 is a lateral cross-sectional view of the rotatable shaft member shown in FIG. 1.

The insert member 18 is a molded dielectric resin product and is configured into a flat disc body, i.e., flat annular body (ring body), as shown in FIGS. 3 and 4. The insert member 18 includes a center hole 18C, which axially penetrates through the insert member 18. The insert member 18 also includes a plurality of linear segments (serving as engaging portions) 44, which are arranged one after another along an inner peripheral part of the insert member 18, i.e., along a peripheral edge of the center hole 18C of the insert member 18. Each of the linear segments 44 extends in a direction parallel to a tangential direction of the insert member 18 (a tangential direction, which is tangential to an imaginary circle that is coaxial with the insert member 18). As shown in FIG. 1, the insert member 18 is placed on one end surface 16A of the armature 16, which is located on one axial side (Z1 side) of the armature 16, such that an end surface 18B of the insert member 18, which is located on the other axial side (Z2 side), contacts the one end surface 16A of the armature 16. Furthermore, the insert member 18 is coaxial with the armature 16. As shown in FIG. 4, a plurality of protrusions 46 is formed in the end surface 18B of the insert member 18, which is located on the armature 16 side (the other axial side, i.e., Z2 side).

As shown in FIGS. 5 to 10, the rotatable shaft member 20 is integrally molded into one piece as a resin product through resin molding and includes a shaft portion 48, a flange portion 50, a boss portion 52 and a plurality of cooling fins 54, which are integrally formed into the one piece. The shaft portion 48 is configured into a generally cylindrical tubular hollow body, which includes an axial hole 56 therein. Two flat surface segments 58, which are generally parallel to each other and are diametrically opposed to each other, are formed at an end part of the shaft portion 48, which is located on the one axial side (Z1 side). The flat surface segments 58 are adapted to be engaged with a mating member (e.g., a fan) and limit free rotation of the mating member relative to the shaft portion 48.

The flange portion 50 is configured into an annular body and extends around an outer peripheral part of the shaft portion 48. The boss portion 52 projects from the flange portion 50 in the axial direction of the shaft portion 48 on the one axial side (Z1 side). The flange portion 50 and the boss portion 52 are connected to the shaft portion 48 by a plurality of connecting portions 60, which radially outwardly extend from the shaft portion 48 and are placed one after another in the circumferential direction.

The boss portion 52 is configured into an annular body, which extends in a circumferential direction of the flange portion 50 and has a diameter smaller than that of the flange portion 50. One axial end part of an outer peripheral part (outer peripheral surface) of the boss portion 52, which is located on the one axial side (Z1 side), includes a plurality of flat surface segments (serving as engaging portions) 62, which are arranged one after another in the circumferential direction. Each of the flat surface segments 62 extends in a direction parallel to a tangential direction, which is tangential to the outer peripheral part of the boss portion 52 (a tangential direction, which is tangential to an imaginary circle that is coaxial with the boss portion 52). The flat surface segments 62 are configured to be engageable with the linear segments 44, respectively, which are formed along the inner peripheral part of the insert member 18 (see FIGS. 3 and 4). When the flat surface segments 62 are engaged with the linear segments 44, respectively, the insert member 18 is integrally rotatably fixed to the rotatable shaft member 20 (see FIG. 2).

The cooling fins 54 axially project from the flange portion 50 on the other axial side (Z2 side). The cooling fins 54 are arranged one after another at generally equal intervals in the circumferential direction of the flange portion 50. The cooling fins 54 are configured to generate an air flow therearound in the motor receiving space 42 when the rotatable shaft member 20 is rotated.

Figure 11:
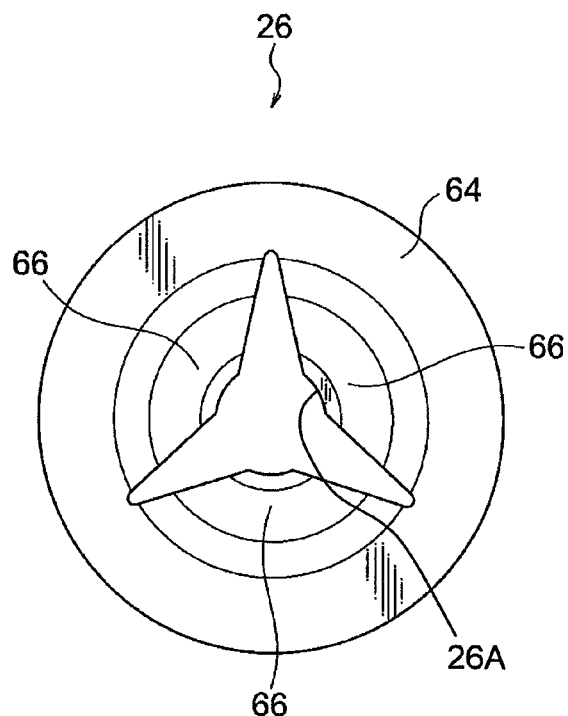
FIG. 11 is a front view of an urging member shown in FIG. 1.
Figure 12:
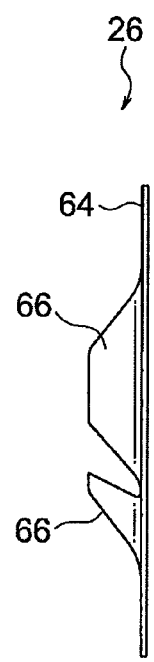
FIG. 12 is a lateral view of the urging member shown in FIG. 1.

With reference to FIGS. 11 and 12, the urging member 26 is made of a spring washer and includes an annular main body 64 and a plurality of resilient pieces 66. The resilient pieces 66 axially project from the annular main body 64 on the one axial side (Z1 side). Furthermore, the urging member 26 includes a center hole 26A, which axially penetrates through the urging member 26 and is surrounded by the resilient pieces 66.

As shown in FIGS. 1 and 2, the magnet 28 is configured into an annular body (ring body). A through hole 68 is formed to axially extend through a center of the magnet 28. The hole 68 is sized such that the ball bearing 24 is insertable through the hole 68, and the cooling fins 54 can be received in the hole 68. Two notches 70 (only one is shown in FIG. 2 for the sake of simplicity) are formed along the peripheral edge of the hole 68 such that each notch 70 is radially outwardly notched, i.e., is radially outwardly recessed from the peripheral edge of the hole 68.

Figure 13:
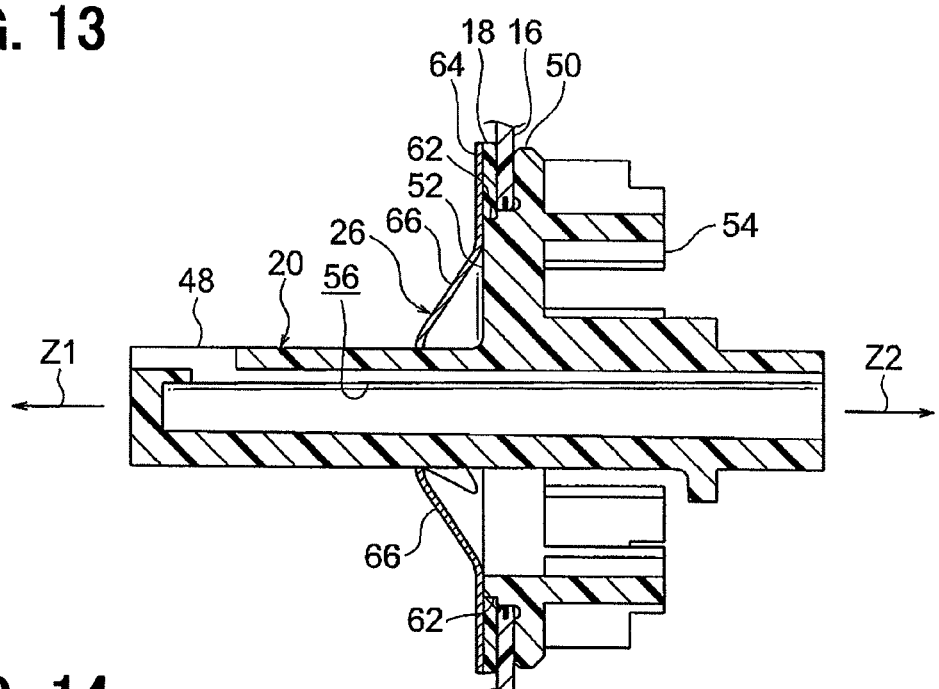
FIG. 13 is a lateral cross sectional view indicating a main feature shown in FIG. 1.
Figure 14:
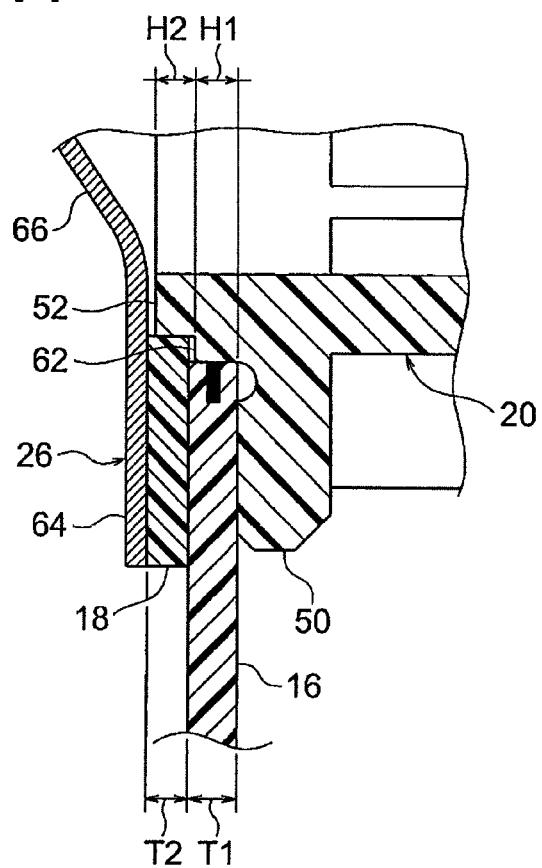
FIG. 14 is an enlarged partial lateral cross sectional view indicating a main feature shown in FIG. 13.

With reference to FIG. 14, which is an enlarged partial view of FIG. 13, an axial thickness T1 of the armature 16, which is measured in the axial direction, and an axial height H1, which is measured in the axial direction from the surface of the flange portion 50 to the surface of the flat surface segment 62, satisfy a relationship of T1>H1.

Furthermore, a sum (i.e., T1+T2) of the axial thickness T1 of the armature 16 and an axial thickness T2 of the insert member 18 measured in the axial direction, and a sum (i.e., H1+H2) of the axial height H1, which is measured in the axial direction from the surface of the flange portion 50 to the surface (axial base surface) of the flat surface segment 62, and an axial height H2, which is measured in the axial direction from the surface of the flat surface segment 62 to an end surface of the boss portion 52, satisfy a relationship of T1+T2>H1+H2.

Furthermore, the ball bearing 24 includes an outer race 72, balls 74 and an inner race 76, as shown in FIG. 1. The balls 74 are received in the outer race 72, and the inner race 76 is rotatably supported by the outer race 72 through the balls 74. The ball bearing 24 further includes a steel plate shield 78 (see FIG. 15). The steel plate shield 78 (more specifically, a radially inner end portion of the steel plate shield 78 shown in FIG. 15) is placed in an inside of the inner race 76, i.e., is axially placed within an axial extent of the inner race 76, and the steel plate shield 78 (more specifically, a radially outer end portion of the steel plate shield 78, which is not shown in FIG. 15) is fixed to the outer race 72 (see FIG. 1).

A step portion 80 is formed in the shaft portion 48 to axially support the inner race 76 of the ball bearing 24 from the one axial side (Z1 side) of the shaft portion 48.

The step portion 80 has an outer diameter, which is larger than an outer diameter of an adjacent part 76A of the inner race 76 of the ball bearing 24, which is axially adjacent to the step portion 80 and forms a receiving space, into which the radially inner end portion of the steel plate shield 78 is receive. The step portion 80 overlaps with the portion (radially inner end portion) of the steel plate shield 78 in the radial direction of the ball bearing 24 (an overlapping length of an overlapping part between the step portion 80 and the steel plate shield 78 is L). In other words, a radial extent of the step portion 80 and a radial extent of the steel plate shield 78 partially overlap with each other in the radial direction of the ball bearing 24 through the overlapping length L.

The dynamoelectric machine 10 is assembled in the following manner.

First of all, with reference to FIG. 2, the brush devices 30 (only one is shown in FIG. 2) are assembled to the end housing 14, and the magnet 28 is assembled to an end surface of the end housing 14, which is located on the motor housing 12 side (Z1 side).

Then, the ball bearing 24 is received in the bearing receiving portion 40, and an axial end part of the shaft portion 48, which is located on the Z2 side, is securely press fitted into the inner race 76 of the ball bearing 24 to rotate integrally therewith.

The armature 16, the insert member 18, the urging member 26 and the ball bearing 22 are sequentially assembled to the rotatable shaft member 20 from the one axial side (Z1 side).

Specifically, the boss portion 52 is fitted to an inner peripheral part of the armature 16, more specifically, is fitted into a center hole 16C of the armature 16, which axially penetrates through the armature 16. At this time, the end surface 16B of the armature 16, which is located on the other axial side (Z2 side), is supported by the flange portion 50. Furthermore, the boss portion 52 is fitted into the inner peripheral part of the insert member 18, i.e., is fitted into the center hole 18C of the insert member 18. Also, the linear segments 44, which are formed in the insert member 18, and the flat surface segments 62, which are formed in the boss portion 52, are engaged with each other, so that the insert member 18 and the rotatable shaft member 20 are fixed together to rotate integrally. Furthermore, the shaft portion 48 is inserted through the center hole 26A of the urging member 26, which is located radially inward of the resilient pieces 66, so that the resilient pieces 66 are engaged with the shaft portion 48. In this way, the urging member 26 is mounted to the shaft portion 48. The axial part of the shaft portion 48, which is located on the one axial side (Z1 side), is press fitted into an inner race 84 of the ball bearing 22.

The motor housing 12 is assembled to the end housing 14 from the one axial side (Z1 side) of the shaft portion 48, and the ball bearing 22 is received in the bearing receiving portion 38 such that an outer race 86 of the ball bearing 22 is securely held by the bearing receiving portion 38. Thereby, the assembling of the dynamoelectric machine 10 is completed.

The assembling procedure described above is a mere example and may be changed in any appropriate manner.

In the dynamoelectric machine 10, which is assembled in the above-described manner, the armature 16 is rotatably received in the motor housing 12 such that the armature 16 is axially opposed to the magnet 28, as shown in FIG. 1. The brush 88 of each of the brush devices 30 (only one is shown in FIGS. 1 and 2) projects through the corresponding notch 70 of the magnet 28 on the armature 16 side and contacts the end surface (coil pattern forming surface) 16B of the armature 16, which is located on the other axial side (Z2 side). The brush 88 is axially urged against the end surface 16B of the armature 16 by a corresponding coil spring 90.

Furthermore, the shaft portion 48 is inserted through the armature 16, the insert member 18 and the magnet 28. The opposed axial sides of the shaft portion 48 are rotatably supported by the ball bearings 22, 24, respectively. The one end part of the shaft portion 48, which is located on the one axial side (Z1 side), axially projects outwardly from the bearing receiving portion 38.

Furthermore, the ball bearing 22, which serves as the bearing member, is placed between the bottom portion 32 of the motor housing 12 (the bottom portion of the bearing receiving portion 38) and the urging member 26 in the axial direction of the shaft portion 48. The urging member 26 is placed between the ball bearing 22 and the insert member 18 in the axial direction of the shaft portion 48. The urging member 26 contacts the ball bearing 22 on the one axial side (Z1 side) and an end surface 18A of the insert member 18 on the other axial side (Z2 side). Therefore, the urging member 26 is supported by the ball bearing 22 on the one axial side (Z1 side) and axially urges the armature 16 against the flange portion 50 on the other axial side (Z2 side).

The insert member 18 is placed between the urging member 26 and the armature 16 in the axial direction of the shaft portion 48 and is urged against the end surface 16A of the armature 16, which is located on the one axial side (Z1 side) of the armature 16, through the urging member 26.

Figure 15:
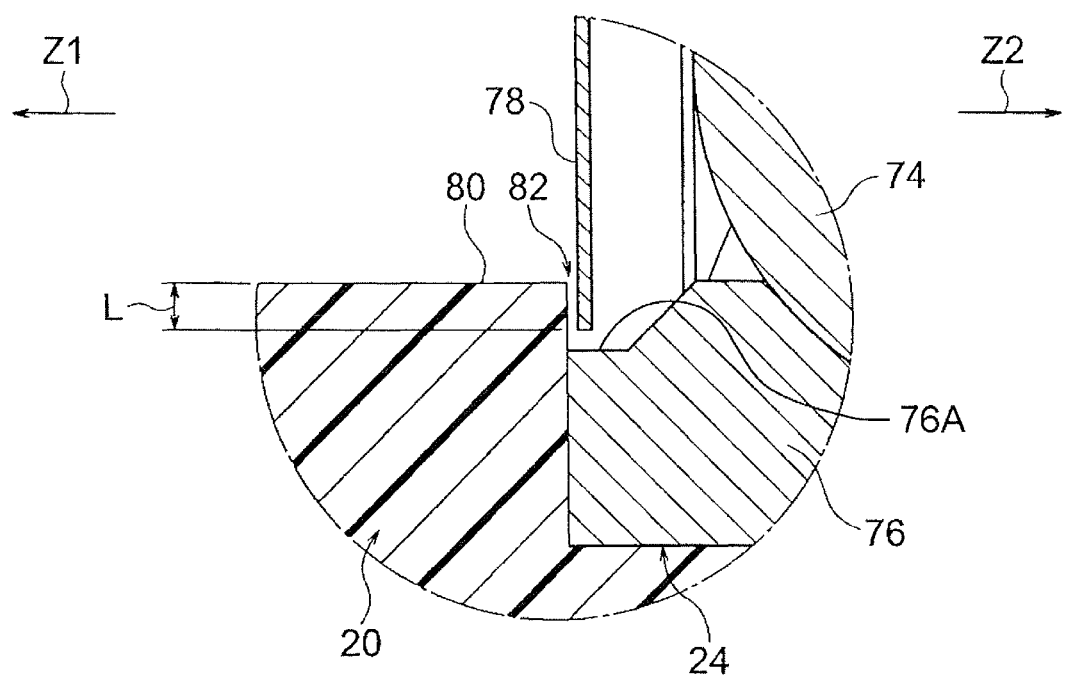
FIG. 15 is an enlarged partial lateral cross sectional view indicating a main feature shown in FIG. 1.

Furthermore, as shown in FIG. 15, the steel plate shield 78 is placed on the one axial side (Z1 side) of the balls 74 in the axial direction of the shaft portion 48, and a labyrinth structure 82 (a maze passage), which is configured into an L-shape, is formed by the steel plate shield 78 and the step portion 80.

Next, advantages of the present embodiment will be described.

In the dynamoelectric machine 10, the rotatable shaft member 20 is entirely made of the resin material though the resin molding. Therefore, at the time of resin molding of the rotatable shaft member 20, the functional components, such as the shaft portion 48, the flange portion 50 and the boss portion 52, can be formed integrally in the rotatable shaft member 20 without requiring any additional steps. Thus, it is possible to reduce the manufacturing costs.

Furthermore, the armature 16, the insert member 18, the urging member 26 and the ball bearing 22 can be assembled sequentially to the rotatable shaft member 20 from the one axial side (Z1 side) of the shaft portion 48. Therefore, for example, it is not required to assemble the insert member 18 or any other component to the armature 16 to form a subassembly prior to the assembling of the armature 16 to the rotatable shaft member 20. Therefore, the number of the assembling steps can be reduced, and thereby the manufacturing costs can be reduced.

Furthermore, the urging member 26 contact the ball bearing 22 at the one axial side (Z1 side) and urges the armature 16 toward the flange portion 50 side (Z2 side) at the other axial side (Z2 side), so that the urging member 26 applies a preload (pressure) against the ball bearing 22 as a reaction force.

Furthermore, the linear segments 44, which are formed along the inner peripheral part of the insert member 18, and the flat surface segments 62, which are formed in the outer peripheral part of the boss portion 52, are engaged with each other, so that the insert member 18 is fixed to the rotatable shaft member 20 in the integrally rotatable manner. Thereby, the free rotation of insert member 18 relative to the rotatable shaft member 20 can be limited.

Figure 16:
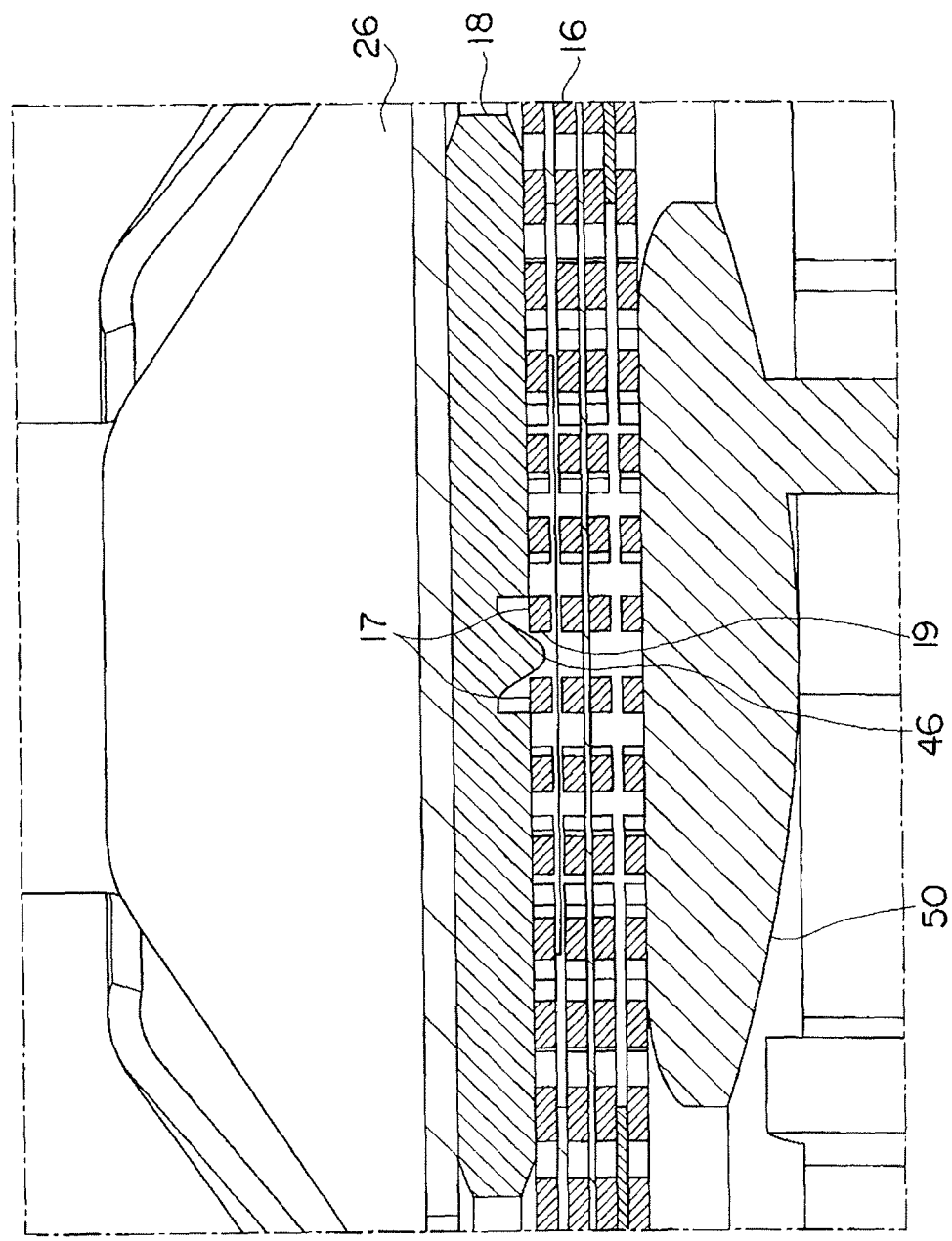
FIG. 16 is an enlarged partial lateral cross sectional view indicating a main feature shown in FIG. 1.

The protrusions 46 are formed in the end surface 18B of the insert member 18, which is located on the armature 16 side. Therefore, a frictional resistance between the insert member 18 and the armature 16 is increased by the protrusions 46. Furthermore, for instance, as shown in FIG. 16, when the protrusion 46 is inserted in a recess 19, which is defined between adjacent parts of the coil pattern 17 formed in the surface of the armature 16, the armature 16 can be effectively integrally rotated together with the rotatable shaft member 20.

Furthermore, when the rotatable shaft member 20 is rotated, the cooling fins 54 of the rotatable shaft member 20 create the air flow in the motor receiving space 42 upon the rotation of the rotatable shaft member 20. Therefore, the components (e.g., the ball bearing 24, the brushes 88, the contact surface 16B of the armature 16, along which the brushes 88 slidably contact), which are received in the motor receiving space 42, can be cooled.

Furthermore, the labyrinth structure 82 is formed by the steel plate shield 78 of the ball bearing 24 and the step portion 80 of the shaft portion 48. Therefore, it is possible to limit intrusion of foreign objects (e.g., foreign contaminants) into the inside of the ball bearing 24.

The armature 16 is formed as the printed coils, which include the coil patterns. Therefore, the axial size of the dynamoelectric machine 10 can be reduced.

Next, modifications of the above embodiment will be described.

Figure 17:
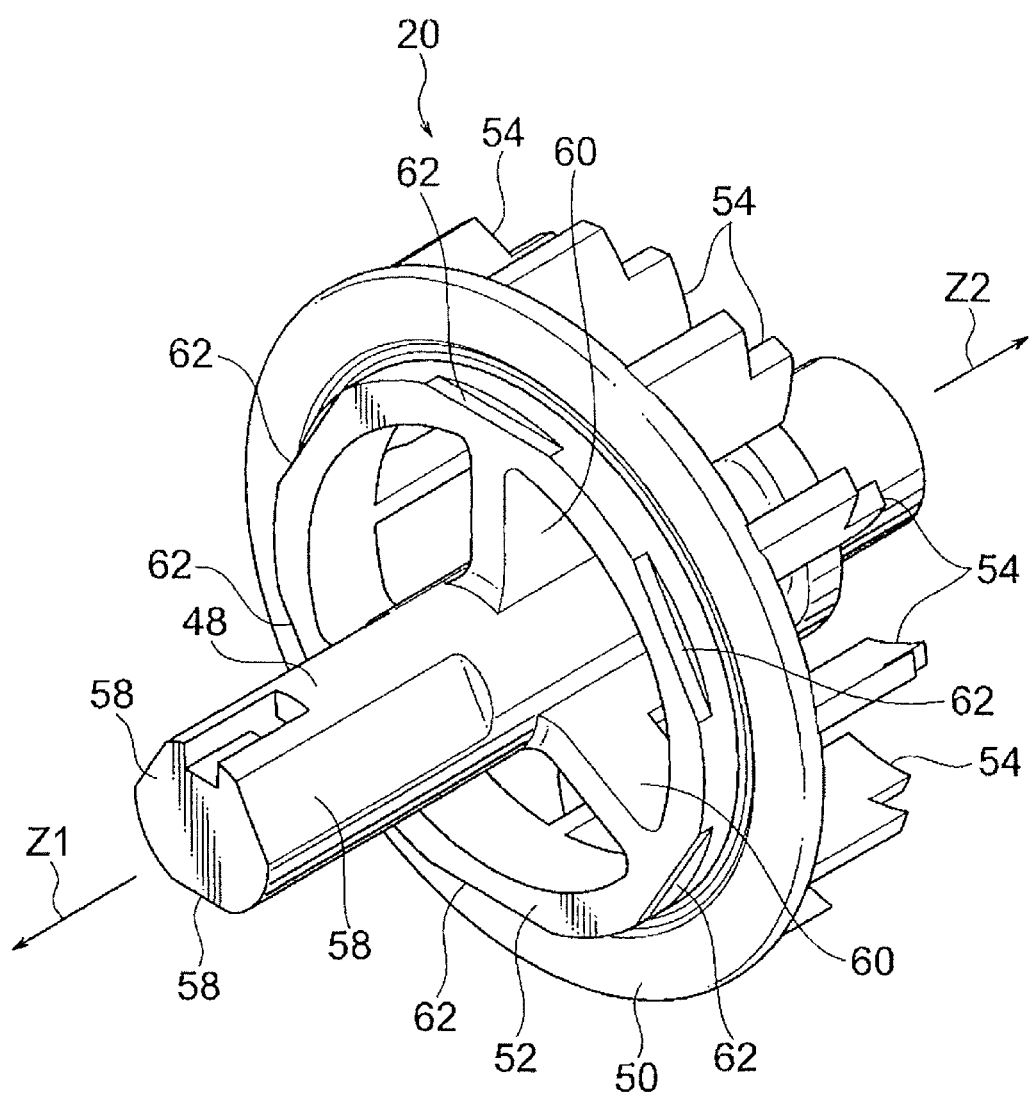
FIG. 17 is a front perspective view similar to FIG. 5, indicating a modification of the rotatable shaft member shown in FIG. 1.

In the above embodiment, the two flat surface segments 58 are formed in the end part of the shaft portion 48, which is located on the one axial side. Alternatively, the number of the flat surface segments 58 may be modified to any other appropriate number depending on the type of the mating member, which is fixed to the end part of the shaft portion 48 located on the one axial side (Z1 side). For instance, as shown in FIG. 17, the number of the flat surface segments 58 may be two or more (three in the instance shown in FIG. 17).

Furthermore, in the above embodiment, the urging member 26 is made of the spring washer. Alternatively, the urging member 26 may be made of any other member, which is other than the spring washer, as long as the urging member 26 can urge the armature 16 toward the flange portion 50.

In the above embodiment, the linear segments 44, which are formed in the inner peripheral part of the insert member 18, and the flat surface segments 62, which are formed in the outer peripheral part of the boss portion 52, are engaged with each other. In this way, the insert member 18 is integrally rotatably fixed to the rotatable shaft member 20. Alternatively, the insert member 18 may be fixed to the rotatable shaft member 20 to rotate integrally with the rotatable shaft member 20 through any other engaging structure.

The embodiment of the present invention has been described above. However, the present invention is not limited to the above embodiment, and the above embodiment may be modified in various ways without departing from the spirit and scope of the present invention.

What is claimed is:

1. A dynamoelectric machine comprising:
   a motor housing that includes a bottom portion and a tubular portion, wherein the tubular portion axially projects from the bottom portion;
   an armature that is configured into an annular body and is rotatably received in the motor housing;
   an insert member that is configured into an annular body and is coaxial with the armature, wherein the insert member is placed on one end surface of the armature on one axial side where the bottom portion of the motor housing is located;
   a rotatable shaft member that is integrally molded into one piece from a resin material and includes:
     a shaft portion, which axially extends through the armature and the insert member;
     a flange portion, which is formed around an outer peripheral part of the shaft portion and supports the other end surface of the armature on the other axial side, which is opposite from the bottom portion of the motor housing; and
     a boss portion, which axially projects from the flange portion on the one axial side and to which the armature and the insert member are fitted; and
   an urging member that is axially placed between the bottom portion of the motor housing and the insert member and axially urges the armature against the flange portion.

2. The dynamoelectric machine according to claim 1, further comprising a bearing member that is axially placed between the bottom portion of the motor housing and the urging member and rotatably supports the shaft portion relative to the motor housing, where the urging member is axially supported by the bearing member on the one axial side and axially urges the armature against the flange portion on the other axial side.

3. The dynamoelectric machine according to claim 1, wherein:
   at least one engaging portion is formed in an inner peripheral part of the insert member; and
   at least one engaging portion is formed in an outer peripheral part of the boss portion and is engaged with the at least one engaging portion of the insert member to fix the insert member to the rotatable shaft member and thereby to rotate the insert member integrally with the rotatable shaft member upon rotation of the rotatable shaft member.

4. The dynamoelectric machine according to claim 3, wherein a plurality of protrusions is formed in an end surface of the insert member, which contacts the armature.

5. The dynamoelectric machine according to claim 1, further comprising an end housing, which closes an opening of the tubular portion of the motor housing on the other axial side, wherein:
   the end housing and the motor housing cooperate together to form a motor receiving space therein, wherein:
   the rotatable shaft member further includes a plurality of cooling fins, which are molded integrally in the rotatable shaft member and are disposed in the motor receiving space; and
   the plurality of cooling fins is adapted to generate an air flow in the motor receiving space upon rotation of the rotatable shaft member.

6. The dynamoelectric machine according to claim 1, further comprising:
   an end housing, which closes an opening of the tubular portion of the motor housing on the other axial side; and
   a ball bearing that includes:
     an outer race, which is fixed to the end housing;
     a plurality of balls, which are received in the outer race;
     an inner race, which is rotatably supported by the outer race through the plurality of balls and is fixed to an axial part of the shaft portion on the other axial side to rotate integrally with the shaft portion; and
     a steel plate shield, which is placed in an inside of the inner race on the one axial side of the plurality of balls and is fixed to the outer race, wherein:
   a step portion is formed in the shaft portion to support the inner race from the one axial side and has an outer diameter, which is larger than an outer diameter of an adjacent part of the inner race, which is axially adjacent to the step portion; and
   a radial extent of the steel plate shield partially overlaps with a radial extent of the step portion in a radial direction of the ball bearing.

7. The dynamoelectric machine according to claim 1, wherein the armature includes a printed coil that has a coil pattern.

* * * * *